May 6, 1969     J. H. KOST ET AL     3,442,408
SPARE TIRE CARRIER
Filed May 19, 1967
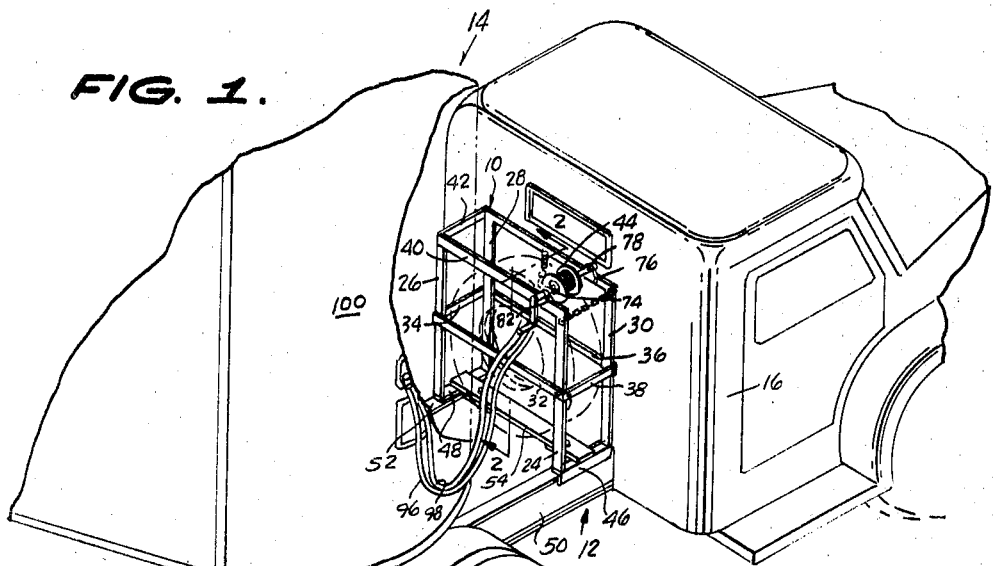
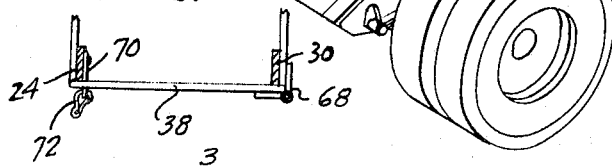
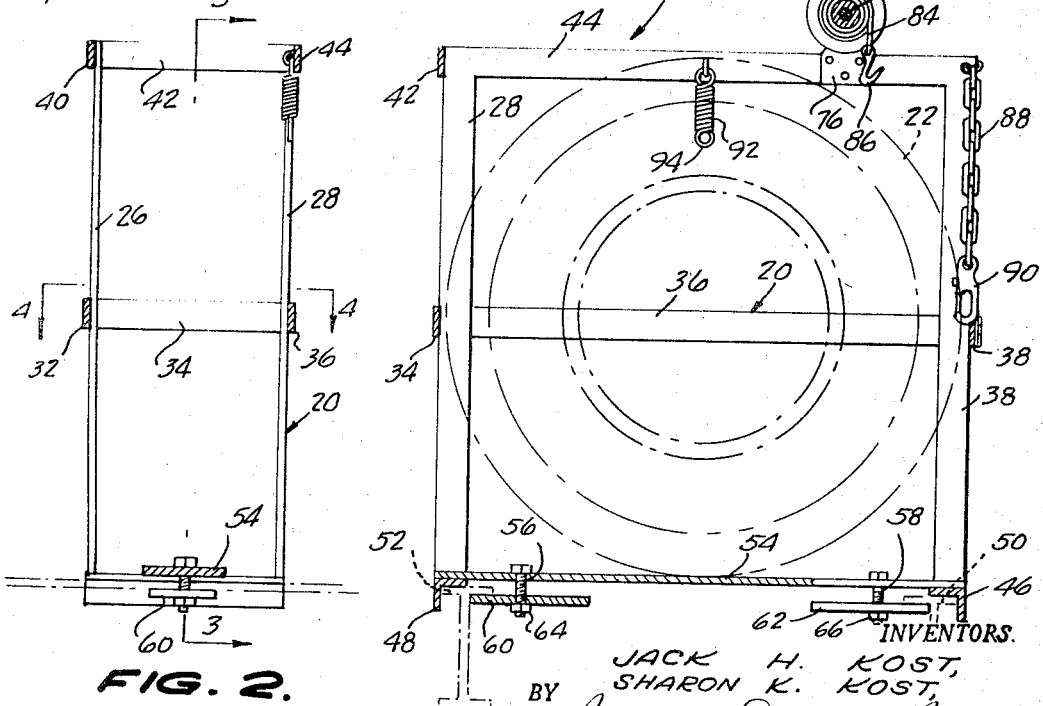
INVENTORS.
JACK H. KOST,
SHARON K. KOST,
BY Berman, Davidson & Berman
ATTORNEYS.

United States Patent Office 3,442,408
Patented May 6, 1969

3,442,408
SPARE TIRE CARRIER
Jack H. Kost and Sharon K. Kost, both of
Martin, N. Dak. 58758
Filed May 19, 1967, Ser. No. 639,667
Int. Cl. B62d 43/02
U.S. Cl. 214—451                              4 Claims

ABSTRACT OF THE DISCLOSURE

A spare tire carrier for a tractor-trailer rig. The tire carrier comprises an open framework cage seated on and secured to the I-beam frame of the rig behind the cab. A tire is hoisted by a winch mounted on the cage, into the cage through an open side in the framework. A hinged latch bar on the cage closes the open side of the framework to prevent accidental displacement of the tire from its housed position.

---

This invention relates to a tire carrier and more particularly, a tire carrier adapted to be removably mounted on a vehicle for housing a spare tire for the vehicle.

It is an object of this invention to provide a carrier for housing a spare tire for a vehicle which can be removably mounted on the vehicle during transit, and includes means for lifting the tire from a ground supporting position to its housed position within the carrier.

A further object of this invention is to provide a spare tire carrier of the character described which is designed to be mounted upon the frame of a tractor-trailer rig.

A further object of this invention is to provide a spare tire carrier of the character described which is designed to be mounted upon the frame of a tractor-trailer rig.

A still further object of the invention is to provide a spare tire carrier of the character described which is simple in construction and comprises a minimum number of component parts, but which carries out its function in an expedient and safe fashion.

Further objects and advantages of this invention will become apparent from the following description and claims, and from the accompanying drawing, wherein:

FIGURE 1 is a perspective view of the spare tire carrier, illustrated mounted upon the frame of a tractor-trailer rig;

FIGURE 2 is a cross-sectional view thereof taken substantially along the plane indicated by line 2—2 of FIGURE 1;

FIGURE 3 is a cross-sectional view thereof taken substantially along the plane indicated by line 3—3 of FIGURE 2; and FIGURE 4 is a fragmentary cross-sectional view thereof taken substantially along the plane indicated by line 4—4 of FIGURE 2.

Referring now to the drawing, wherein like numerals indicate like elements throughout the several views, the spare tire carrier is generally designated by the numeral 10, and is mounted on an exposed portion of the frame 12 of a tractor-trailer rig 14, behind its cab 16.

The spare tire carrier 10 consists of an open framework forming a cage 20 for housing a spare tire 22 for the rig 14.

Cage 20 includes vertical parallel bars 24, 26, 28, and 30, connected by horizontal bars 32, 34, 36 and 38 lying in the same plane, and a second series of horizontal bars 40, 42 and 44, lying in the same plane, above the plane of bars 32, 34, 36 and 38. The horizontal bars, except bar 38, are connected to the vertical bars by standard means, such as by welding.

At their lower ends, vertical bars 24 and 30 are connected to an angle iron support 46, and vertical bars 26 and 28 are connected to an angle iron support 48. Angle irons 46 and 48 are seated on exposed portions of the top flanges of I-beams 50 and 52, respectively, of the frame 12.

A tire support or platform 54 extends across the bottom of cage 20 and is connected by suitable means to the top flanges of angle irons 46 and 48. Connected to the underneath side of platform 54 by studs 56 and 58 are plates 60 and 62, respectively.

Plates 60 and 62 are disposed beneath the top flanges of I-beams 50 and 52, and upon tightening of nuts 64 and 66 on the ends of studs 56 and 58, clamp the angle irons 46 and 48 and cage 20 to the I-beams.

One lateral side of cage 20 is left open to form an access opening to receive spare tire 22. The opening is formed by not providing a horizontal bar between vertical bars 24 and 30 in the plane of horizontal bars 40, 42 and 44. Horizontal bar 38, as shown in FIGURE 4, is hingedly connected by a piano hinge 68 to vertical bar 30 intermediate its ends, and is adapted to swing in the plane of bars 32, 34 and 36, from a position closing the access to the interior of cage 20, as shown in FIGURES 1 and 4, to a position flush with rear wall of cab 16 to provide access to the interior of the cage.

Secured to vertical bar 24 is a latch plate 70, which, when bar 38 is swung closed, extends through an opening in bar 38. A lock, such as a snap clip 72 can be threaded through an opening in the latch plate 70 to prevent bar 38 from pivoting about hinge 68.

Mounted upon horizontal bars 40 and 44, intermediate their ends, are upstanding brackets 74 and 76. The brackets 74 and 76 include aligned openings for receiving the shaft 78 of a winch 80 for use in hoisting tire 22 to its housed position within cage 20. A crank 82 connected to shaft 78 is adapted to turn winch 80 and wind cable 84, having a hook 86 connected to its end, upon the winch.

In operation, after cage 20 has been mounted upon I-beams 50 and 52, bar 38 is swung about hinge 68 to open access into the interior of the cage. Cable 84 is then lowered and wrapped around the casing of tire 22. Hook 86 engages the portion of cable 84 entering the tire casing to complete a loop thereabout.

Upon rotation of crank 82 the tire 22 can then be hoisted from a ground engaging position into the interior of cage 20 and seated in supporting engagement upon platform 54. The hook 86 is then disengaged and cable 84 wound back upon winch 80.

Bar 38 is then swung closed, and lock 72 engaged to prevent the tire 22 from rolling out of the cage. As an extra safety precaution a chain 88, having a snap hook 90 secured to one end, is swivelly mounted on the end of bar 30 adjacent the access opening. The chain 88 can be extended across the access opening and hook 90 secured through an opening at the top of bar 24.

In order to make the spare tire carrier 10 reversible, horizontal bar 34 could be made pivotable in the same manner as bar 38.

Depending from the middle of horizontal bar 44 is a coil spring 92, having a hooked end 94 for holding air cable 96 and electric cable 98, extending between cab 16 and trailer 100, spaced above horizontal bars 32 and 36, and preventing abrasion therewith.

While a specific embodiment of our invention has been disclosed in the foregoing description, it will be understood that various modifications within the spirit of the invention may occur to those skilled in the art. The invention, therefore, is not intended to be restricted to the exact showing of the drawings and description thereof, but is considered to include reasonable and obvious equivalents.

We claim:
1. A spare tire carrier, adapted to be mounted upon the frame of a vehicle, comprising a cage for housing a tire and constructed from four vertical bars connected by three upper horizontal bars and three lower horizontal bars forming a three-sided open framework, means on the bottom of said cage for mounting it on the frame of a vehicle, means within said cage for supporting a spare tire, one side of said cage being normally open and unobstructed to form an entrance passage into the interior thereof, pivotable latch means on said cage for closing said normally open and unobstructed side of said cage to capture a tire supported therein on said support means and winch means mounted on said upper horizontal bars adjacent said one open side for hoisting or lowering a spare tire into or out of said cage through said normally open side.

2. A spare tire carrier in accordance with claim 1, wherein said latch means includes a horizontal bar attached to a vertical bar adjacent the open side of said framework and pivotable about a vertical axis across said open side, and means on said framework for retaining said pivotable bar across said open side.

3. A spare tire carrier in accordance with claim 2, wherein said means for mounting said cage on the frame of a vehicle includes a pair of oppositely opening angle iron members attached to the bottoms and connecting opposite pairs of said vertical bars to seat upon the tops and embrace the outer edges of the top flanges of I-bars forming the vehicle frame, a pair of clamping plates secured to the bottom of said framework for releasable engagement with the bottoms of said I-bar top flanges, and means for moving said plates into and out of said engagement.

4. A spare tire carrier in accordance with claim 3, wherein said means for supporting said tire includes a platform extending between and secured to said angle iron mounting members, said clamping plates depending from said platform adjacent said angle iron mounting members, and said means for moving said plates acting to vertically adjust the plates in clamping engagement with said I-bar flanges.

References Cited

UNITED STATES PATENTS

| | | | |
|---|---|---|---|
| 2,162,046 | 6/1939 | Albinson | |
| 2,377,149 | 5/1945 | Heil | 214—451 |
| 3,372,821 | 3/1968 | Podhajsky | 214—451 |

HUGO O. SCHULZ, *Primary Examiner.*